(12) United States Patent
Nakajima et al.

(10) Patent No.: US 8,295,666 B2
(45) Date of Patent: Oct. 23, 2012

(54) COATED OPTICAL FIBERS

(75) Inventors: Yasuo Nakajima, Tokyo (JP); Hiroki Tanaka, Tokyo (JP); Kouji Mochizuki, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 282 days.

(21) Appl. No.: 12/626,814

(22) Filed: Nov. 27, 2009

(65) Prior Publication Data

US 2010/0119198 A1    May 13, 2010

Related U.S. Application Data

(63) Continuation of application No. PCT/JP2009/052541, filed on Feb. 16, 2009.

(30) Foreign Application Priority Data

Mar. 14, 2008    (JP) ................................. 2008-065528

(51) Int. Cl.
*G02B 6/44* (2006.01)
*G02B 6/02* (2006.01)
*G02B 6/00* (2006.01)

(52) U.S. Cl. .................... 385/114; 385/128; 385/144

(58) Field of Classification Search .................. None
See application file for complete search history.

(56) References Cited

U.S. PATENT DOCUMENTS

| 5,402,516 | A  | * | 3/1995 | Blyler et al. ................... 385/141 |
| 7,551,825 | B2 |   | 6/2009 | Nakajima et al. |
| 2009/0022461 | A1 | | 1/2009 | Nakajima et al. |
| 2009/0232461 | A1 | | 9/2009 | Nakajima et al. |
| 2009/0269015 | A1 | | 10/2009 | Nakajima et al. |

FOREIGN PATENT DOCUMENTS

| JP | 08-188450 | 7/1996 |
| JP | 2004-012679 | 1/2004 |
| WO | WO 2008/012926 | 1/2008 |

OTHER PUBLICATIONS

N. Akasaka, et al., "Design of Optical Fiber Coating", Proc. of 19$^{th}$ Australian Conference on Optical Fiber Technology (ACOFT), 1994, pp. 375-378.
U.S. Appl. No. 11/794,253, filed Jun. 27, 2007, Nakajima, et al.

* cited by examiner

*Primary Examiner* — Uyen Chau N Le
*Assistant Examiner* — Chris Chu
(74) *Attorney, Agent, or Firm* — Oblon, Spivak, McClelland, Maier & Neustadt, L.L.P.

(57) ABSTRACT

A coated optical fiber of the present invention comprises a glass fiber coated by at least two coating layers (a soft layer and a hard layer), wherein the glass surface of the glass fiber, where the at least two coating layers of the optical fiber are removed, has a peak intensity ratio of 0.6 or more in $C_3H_7O+$ (m/z 59) or $C_4H_9O+$ (m/z 73) with respect to $Si+$ (m/z 28) peak in cation analysis of TOF-SIMS. The optical fiber suppresses increase in its transmission loss even when it is exposed to a high-humidity environment or immersed in water.

6 Claims, 2 Drawing Sheets

COATED OPTICAL FIBERS

CROSS-REFERENCES TO RELATED APPLICATIONS

This application is a continuation application of International Application No. PCT/JP2009/052541, filed on Feb. 16, 2009, the entire contents of which are incorporated by reference herein.

This application also claims the benefit of priority from Japanese Patent Application No. 2008-065528 filed Mar. 14, 2008, the entire contents of which is incorporated herein by reference.

TECHNICAL FIELD

The present invention relates to coated optical fibers to be positioned within an optical fiber cable. More specifically, it relates to a coated optical fiber, which suppresses its transmission loss increase due to environmental or age deterioration; and especially, it relates to a water resistant coated optical fiber, which is less likely to increase its transmission loss during high-humidity and/or water immersion.

BACKGROUND OF THE INVENTION

In optical fiber manufacturing, during the drawing process, a coating resin is coated around the circumference of a silica glass fiber immediately after the fiber is drawn to prevent strength reduction of the resulting optical fiber. An ultraviolet-curable resin, particularly a urethane-acrylate-type or an epoxy-acrylate-type, is generally used as the coating resin for the optical fiber.

An optical fiber increases transmission loss due to external stress and microbends caused by such external stress. To protect the optical fiber from external stress, the optical fiber is usually coated with two layers (a soft layer and a hard layer) of coatings. For the inner layer, which directly contacts the silica glass, a soft resin with low Young's modulus is used as a buffer layer (hereafter a primary layer), and for the outer layer, a hard resin with high Young's modulus is used as a protective layer (hereafter a secondary layer). Conventionally, a resin with 3 MPa or less in Young's modulus is used as the primary layer, and a resin with 500 MPa or more in Young's modulus is used as the secondary layer.

In a typical optical fiber manufacturing method, a silica glass fiber is drawn from a silica glass preform by heating the bottom portion of the preform in a drawing furnace; then, a primary layer and a secondary layer are coated by applying liquid ultraviolet-curable resins via coating dies to the drawn silica fiber, and by curing the resins with ultraviolet light.

In the next process, a colored optical fiber is created by applying a color layer made from a colored resin around the circumference of the optical fiber. The structure of the optical fiber is shown in FIG. 1. In this specification, a silica-glass fiber coated with a primary layer and a secondary layer is called an optical fiber. An optical fiber coated with a color layer made from a colored resin around the circumference of the optical fiber is called a colored optical fiber, and multiple optical fibers positioned in a planar array and bound together with a ribbon resin is called an optical fiber ribbon. Also, the term "coated optical fiber" includes glass fibers with coatings; more specifically, it includes an optical fiber; and a colored optical fiber.

When such a coated optical fiber is immersed in water, its transmission loss may increase. To create highly reliable coated optical fibers, which do not increase their transmission loss even if the coated optical fiber is immersed in water for a long period of time, various suggestions such as improvement in adhesive strength between a primary layer and a glass fiber, have been made.

As the popularity of optical fibers is growing in recent years, the number of optical fiber cable applications is increasing, which indicates that the environments where optical fiber cables are used has been diversified, and new cable structures are being developed. Because of that, the long-term reliability required for optical fiber cables becomes stricter. With the situation as stated above, a coated optical fiber, which is less likely to increase its transmission loss when it is immersed in water, is being considered. However, it has a limit in handling the above-stated issue by controlling the adhesive strength between each layer; and currently such technology is used in combination with structures, which avoid water to reach the coated optical fiber or reduce the amount of water reaching the coated optical fiber by changing cable structures, cords and/or sheath material. However, these approaches do not offer sufficient reliability.

SUMMARY OF THE INVENTION MEANS FOR SOLVING THE PROBLEM

It is an object of the present invention to at least partially solve the problems in the conventional technology.

The purpose of the present invention is, for example, to provide a coated optical fiber to be positioned within an optical fiber cable, which suppresses its transmission loss increase due to environmental or age deterioration, especially when it is exposed to high-humidity and/or water immersion.

In accordance with the present invention, a coated optical fiber comprises a glass optical fiber coated by at least two coating layers (a soft layer and a hard layer), wherein the glass surface of the glass fiber, where the at least two coating layers of the optical fiber are removed, has a peak intensity ratio of 0.6 or more in $C_3H_7O+$ (m/z 59) or $C_4H_9O+$ (m/z 73) with respect to $Si+$ (m/z 28) peak in cation analysis of Time-of-Flight Secondary Ion Mass Spectrometry (TOF-SIMS). Furthermore, in accordance with the present invention, an optical fiber ribbon comprises a coated optical fiber comprises a glass fiber coated by at least two coating layers, a soft layer and a hard layer, and a ribbon resin, which binds multiple coated optical fibers together in a planar array, wherein the glass surface of the optical fiber, where the at least two coating layers of the optical fiber are removed, has a peak intensity ratio of 0.6 or more in C3H7O+ (m/z 59) or C4H9O+ (m/z 73) with respect to Si+ (m/z 28) peak in cation analysis of Time-of-Flight Secondary Ion Mass Spectrometry (TOF-SIMS).

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

Referring now to the drawings.

DETAIL DESCRIPTION

Figure 1:
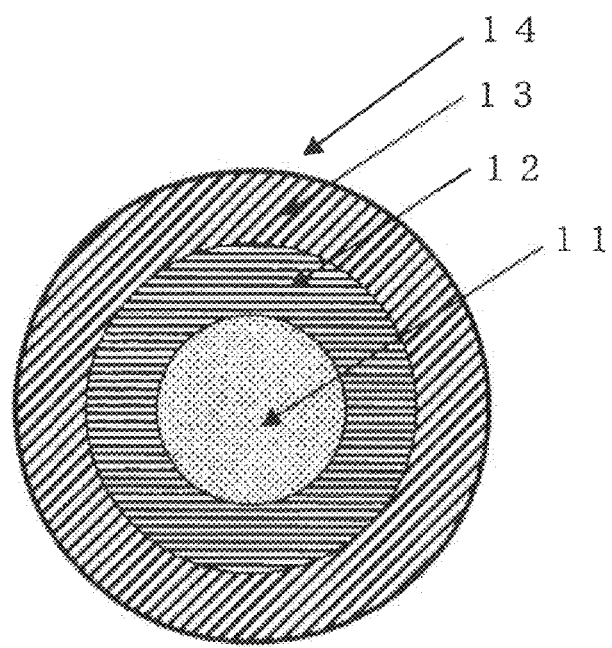
FIG. 1 is a cross-sectional view of an optical fiber as an embodiment of the present invention.

Below, coated optical fibers and optical fiber ribbons according the present invention are explained in detail using figures. Also below, details about the present invention are explained. As a result of committed research to identify a cause of increased transmission loss of a coated optical fiber when it is exposed to a high-humidity environment or immersed in water, the inventors of the present invention found that delamination is observed between the primary layer and the glass fiber of the coated optical fiber, which increased its transmission loss.

The delamination between the primary layer and the glass fiber occurs when a force to tear off a coating layer in a boundary face between the glass fiber and a coating layer is greater than the boundary face adhesive force between the glass fiber and the coating layer. When delamination occurs at the boundary face, a force applied to the glass becomes uneven, which causes microbending and a consequent increase in transmission loss.

The mechanism of reduction in the boundary face adhesive force between the glass fiber and the coating layer when the coated optical fiber is immersed in water is inferred as follows. When the coated optical fiber is immersed in water or exposed to a high-humidity environment, moisture passes through the coating layer and reaches a boundary face between the glass fiber and the primary layer. The adhesive force exists at the boundary face between the glass fiber and the primary layer, and in general, the adhesive force comprises hydrogen bonds between glass and a functional group in a resin, and chemical bonds from an adhesion accelerator (see for example, N. Akasaka et al., "Design of Optical Fiber Coating", Proc. of 19th Australian Conference on Optical Fibre Technology (ACOFT), p. 375, 1994). However, it is believed that the hydrogen bonds are disconnected when the water penetrates the boundary face between the glass and the primary layer. As stated above, it is inferred that the adhesive force at the boundary face between the glass and the primary layer is reduced by the disconnection of hydrogen bonds.

As embodiments of the present invention, an optical fiber is manufactured by coating a primary layer and a secondary layer around a glass fiber, and a colored optical fiber is manufactured by applying a color layer onto the optical fiber. An ultraviolet-curable resin is used for each coating layer. Furthermore, depending on the application, an optical fiber ribbon can be manufactured by positioning multiple optical fibers or colored optical fibers in a planar array and binding them together with a ribbon resin.

The ultraviolet-curable resin used as a coating resin and/or a color-coating resin primarily comprises an oligomer, a diluent monomer, a photoinitiator, a chain transfer agent, a silane coupling agent, and other additive agents. As for the oligomer, a urethane-acrylate-type, an epoxy-acrylate-type or a polyester-acrylate-type, is mainly used. As for the diluent monomer, mono-functional acrylate or multi-functional acrylate is used.

The coated optical fiber comprises an optical fiber, which includes a glass fiber coated by at least two coating layers (a soft layer and a hard layer), wherein the glass surface of the glass fiber, where the at least two coating layers of the optical fiber are removed, has a peak intensity ratio of 0.6 or more in $C_3H_7O+$ (m/z 59) or $C_4H_9O+$ (m/z 73) with respect to Si+ (m/z 28) peak in cation analysis of Time-of-Flight Secondary Ion Mass Spectrometry (TOF-SIMS), prevents increase in its transmission loss.

Below, the principle of Time-of-Flight Secondary Ion Mass Spectrometry (TOF-SIMS) is explained. When primary ions are irradiated to the surface of a sample within a high vacuum environment, some of the molecules comprising the surface of the sample are ionized and released as secondary ions. Then, the chemical information of the sample's surface is evaluated using a mass spectrometry. This is the fundamental principle of the Secondary Ion Mass-spectrometry (SIMS). There are two different modes (Dynamic-SIMS and Static-SIMS) within a SIMS measurement. The difference is made by changing the irradiation amount of primary ions. TOF-SIMS is a part of Static-SIMS. Because the mechanism for creating secondary ions is different, the quality of information that can be obtained is significantly different between the two modes. In the case of Static-SIMS, the secondary ions are released while the molecular structure of the sample is maintained by reducing the irradiation amount of primary ions to be sufficiently smaller than the number of molecules comprising the sample's surface. Because a significant amount of information regarding molecular structure is obtained, it is advantageous for analyzing the composition of organic matter. Furthermore, because information is obtained only from a very shallow area (a few nm), it is advantageous for analyzing the correlation with surface properties.

In TOF-SIMS, the primary ions are irradiated in pulses, and $^{69}Ga$ is commonly used as the primary ions. Then, the released secondary ions gain certain energy and are introduced to a mass spectrometer. The relationship between the kinetic energy E and the traveling velocity v is shown in equation (1) below:

$$E=eV_0=mv^2 \quad (1)$$

where
e: charge
$V_0$: accelerated voltage
m: mass

According to the equation above, the traveling velocity depends on the mass of the ion. Because smaller mass reaches the detector faster, mass separation is done according to the traveling time t (time from when the primary ions hit the sample to when the secondary ions reach the detector). The travel time t is expressed in equation (2) below.

$$t=L_0/v=L_0(m/2eV_0)^{1/2}t \quad (2)$$

Where $L_0$ is a distance from the surface of the sample to the detector. The traveling time t is measured by Time-to-Digital-Converter (TDC), and mass-converted the result is a secondary ion mass spectrum.

EMBODIMENTS

As embodiments of the present invention, several optical fibers 14 comprising silica glass fiber 11 coated with two layers of coating resins (a primary layer 12 and a secondary layer 13) as shown in FIG. 1 are manufactured. An ultraviolet-curable resin is used for each layer. The ultraviolet-curable resin primarily comprises an oligomer, a diluent monomer, a photoinitiator, a chain transfer agent, and additive agents. The optical fibers 14 are made by varying the composition of such ultraviolet-curable resin. In cation analysis of TOF-SIMS, peak intensity ratio of $C_3H_7O+$ (m/z 59) or $C_4H_9O+$ (m/z 73) with respect to Si+ (m/z 28) can be adjusted by controlling the framework structure and molecular weight of the oligomer; the kind of diluent monomer used and the amount; or additive agents such as a surface-modifying agent. More specifically, the intensity ratio becomes larger if a surface modifying agent such as a silane coupling agent is added.

Figure 2:
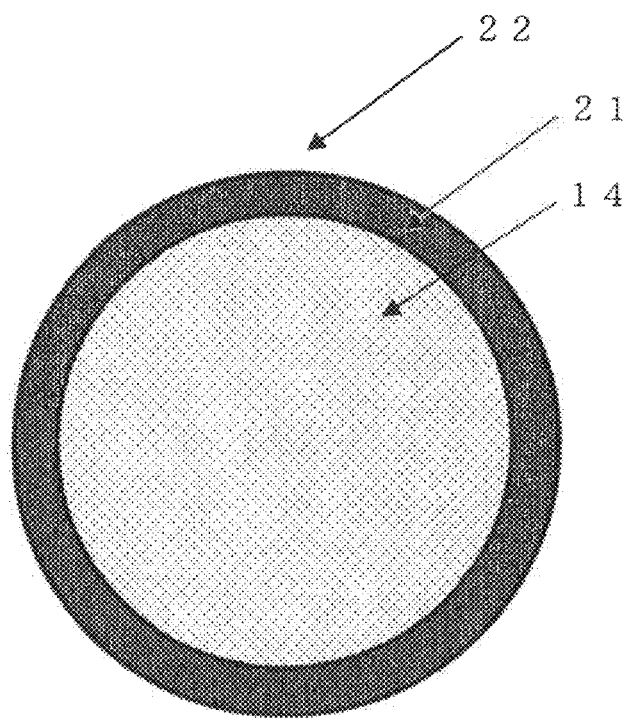
FIG. 2 is a cross-sectional view of a colored optical fiber as an embodiment of the present invention.

FIG. 2 shows a colored optical fiber 22, which is coated with a color layer 21 around the optical fiber 14. The colored optical fiber is manufactured by 1) creating an optical fiber comprising: a silica glass fiber 11 with an outer diameter of 125 μm, a primary layer 12 surrounding the glass fiber 11 and having an outer diameter of 185 μm or 195 μm, and a secondary layer 13 surrounding the first layer 12 and having an outer diameter of 245 μm; 2) then, in a separate process, a colored optical fiber having an outer diameter of 255 μm is created by applying a color layer around the optical fiber. However, in example 2 and comparative example 2, a coloring agent is directly added to the secondary layer in order to make the colored optical fiber which has diameter of 255 μm rather than applying a color layer.

Figure 3:
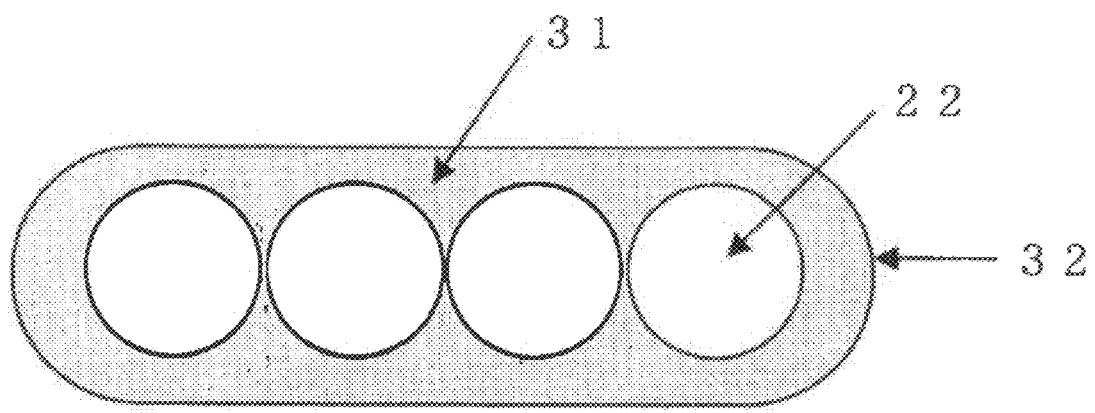
FIG. 3 is a cross-sectional view of an optical fiber ribbon as an embodiment of the present invention.

Furthermore, an optical fiber ribbon 32 can be manufactured by positioning four coated optical fibers 14 in a planar array and binding them together ribbon resin 31 made from an ultraviolet-curable resin as shown in FIG. 3. Comparative examples of coated optical fibers and optical fiber ribbons shown in Table 1 are also manufactured in a similar manner. And after removing the coating layers, the glass surfaces of coated optical fibers are measured by cation analysis of TOF-SIMS. The transmission losses of those fibers are also measured. The result is shown in Table 1.

(TOF-SIMS)

The peak intensity ratio of $C_3H_7O+$ (m/z 59) or $C_4H_9O+$ (m/z 73) with respect to $Si+$ (m/z 28) is calculated by using cation analysis of TOF-SIMS. The coating layers of the sample coated optical fiber are removed by using an optical fiber stripper. Then, after the glass portion of each sample is immersed in acetone for ultrasonic clearing, TOF-SIMS is performed.

(Measurement Method of Transmission Loss)

Approximately 1 km of the coated optical fiber or the optical fiber ribbon is immersed in 60° C. water. Then, after 30 days, transmission loss is measured. An optical pulse testing device MW9060A from the Anritsu company is used to measure the increase in transmission loss. A backscattering coefficient (OTDR) method is used at a wavelength of 1.55 μm. If the increase in transmission loss after 30 days of immersion in 60° C. water is more than 0.1 dB/km, then the fiber is deemed to have insufficient resistance properties (and marked as X in Table 1). Furthermore, the delamination locations within the coated optical fibers are found by observing the coated optical fibers and the optical fiber ribbons with an optical microscope. If any delamination is observed between the glass and the primary layer, then the optical fiber is deemed to have insufficient resistance properties (and marked as X in Table 1).

TABLE 1

| | Examples | | | | | | | |
|---|---|---|---|---|---|---|---|---|
| | 1 | 2 | 3 | 4 | 5 | 6 | 7 | 8 |
| Primary coating layer material Young's modules (MPA) | 0.6 | 0.9 | 0.6 | 0.9 | 0.6 | 0.9 | 0.9 | 0.9 |
| Second coating layer material Young's modules (MPA) | 600 | 800 | 600 | 800 | 600 | 800 | 800 | 800 |
| Primary coating layer diameter (μm) | 185 | 195 | 185 | 195 | 185 | 195 | 195 | 195 |
| Primary coating layer glass transition temperature (° C.) | −17 | −5 | −17 | −5 | −17 | −5 | −5 | −5 |
| Secondary coating layer glass transition temperature (° C.) | 64 | 80 | 64 | 80 | 64 | 80 | 80 | 80 |
| Peak intensity ratio in $C_3H_7O+$ (m/z 59) peak with respect to $Si+$ (m/z 28) | | 0.6 | | 0.6 | | 0.6 | 0.8 | 1.7 |
| Peak intensity ratio in $C_4H_9O+$ (m/z 73) with respect to $Si+$ (m/z 28) peak | 0.6 | | 0.6 | | 0.6 | | | |
| Status of fiber during measurement of transmission loss | OF* | OF* | CTOF** | OFT*** | CTOF** | OFT*** | OFT*** | OFT*** |
| Transmission loss increase (db/km) 60° C. × 30 days, 1.55 μm | 0 | 0 | 0 | 0 | 0 | 0 | 0 | 0 |
| # of delamination | 0 | 0 | 0 | 0 | 0 | 0 | 0 | 0 |
| Judgment | ○ | ○ | ○ | ○ | ○ | ○ | ○ | ○ |

| | Comparative examples | | | | | | |
|---|---|---|---|---|---|---|---|
| | 1 | 2 | 3 | 4 | 5 | 6 | 7 |
| Primary coating layer material Young's modules (MPA) | 0.6 | 0.9 | 0.6 | 0.9 | 0.6 | 0.9 | 0.9 |
| Second coating layer material Young's modules (MPA) | 600 | 800 | 600 | 800 | 600 | 800 | 800 |
| Primary coating layer diameter (μm) | 185 | 195 | 185 | 195 | 185 | 195 | 195 |
| Primary coating layer glass transition temperature (° C.) | −17 | −5 | −17 | −5 | −17 | −5 | −5 |
| Secondary coating layer glass transition temperature (° C.) | 64 | 80 | 64 | 80 | 64 | 80 | 80 |
| Peak intensity ratio in $C_3H_7O+$ (m/z 59) peak with respect to $Si+$ (m/z 28) | | 0.5 | | 0.5 | | 0.5 | 0.2 |
| Peak intensity ratio in $C_4H_9O+$ (m/z 73) with respect to $Si+$ (m/z 28) peak | 0.5 | | 0.5 | | 0.5 | | |
| Status of fiber during measurement of transmission loss | OF* | OF* | CTOF** | OFT*** | CTOF** | OFT*** | OFT*** |

TABLE 1-continued

| | | | | | | | |
|---|---|---|---|---|---|---|---|
| Transmission loss increase (db/km) 60° C. × 30 days, 1.55 μm | 0 | 0 | 0.1 | 0.2 | 0.1 | 0.2 | 0.3 |
| # of delamination | G/P**** | G/P**** | G/P**** | G/P**** | G/P**** | G/P**** | G/P**** |
| Judgment | x | x | x | x | x | x | x |

*OF: optical fiber
**CTOF: Color-coated tight-buffered optical fiber
***OFT: optical fiber tape
****G/P: Delamination between between the primary layer and the glass fiber According to the explanation above, the coated optical fiber comprises a glass fiber coated by at least two coating layers (a soft layer and a hard layer), wherein the glass surface of the glass fiber, where the at least two coating layers of the optical fiber are removed, has a peak intensity ratio of 0.6 or more in $C_3H_7O+$ (m/z 59) or $C_4H_9O+$ (m/z 73) with respect to Si+ (m/z 28) peak in cation analysis of TOF-SIMS, then the coated optical fiber prevents an increase in transmission loss without any delamination in the boundary face between the glass fiber and the primary layer—even when the coated optical fiber is immersed in water for 30 days. Moreover, the same result is achieved when the coated optical fiber is in a colored optical fiber form (examples 3 and 5 of Table 1) or an optical fiber ribbon form (examples 4, 6, 7 and 8 of Table 1).

On the other hand, from the results of comparative examples 1-7, if the peak intensity ratio of $C_3H_7O+$ (m/z 59) or $C_4H_9O+$ (m/z 73) with respect to Si+ (m/z 28) is smaller than 0.6 in cation analysis of TOF-SIMS, then the coated optical fiber either has delamination in the boundary face between the glass and the primary layer, or an increase in its transmission loss by more than 0.1 dB/km.

As stated above, in cation analysis of TOF-SIMS, by increasing the peak intensity ratio of $C_3H_7O+$ (m/z 59) or $C_4H_9O+$ (m/z 73) with respect to Si+ (m/z 28) of a coated optical fiber, the coated optical fiber does not experience any delamination in the boundary face between the glass and the primary layer, and does not increase its transmission loss. The cation detected in the analysis is organic components remained in very thin and shallow area (e.g. a few nm) around the glass surface after acetone ultrasonic clearing. In this analysis, various cations and anions are detected; however, if the peak intensity ratio of $C_3H_7O+$ (m/z 59) or $C_4H_9O+$ (m/z 73) with respect to Si+ (m/z 28) is high, then it does not cause any delamination in the boundary face between the glass and the primary layer, and does not increase its transmission loss even if the fiber is immersed in water. It appears that $C_3H_7O+$ (m/z 59) or $C_4H_9O+$ (m/z 73) originates from the framework components of the oligomer within the ultraviolet-curable resin; and because the components of the oligomer bond strongly with the glass surface, delamination in the boundary face between the glass surface and the primary layer is prevented, and transmission loss is not increased for a long time.

In the embodiments, single-mode fibers with a common step index type refractive index profile are used. However, it is apparent to a person with ordinary skilled in the art that the present invention can apply to optical fibers with other profiles.

As stated above, according to the present invention; coated optical fibers and optical fiber ribbons, which suppresses its transmission loss increase due to environmental or age deterioration, especially under high-humidity state and/or water immersion state, can be obtained.

POSSIBILITY OF INDUSTRIAL APPLICATIONS

The coated optical fiber of the present invention suppresses increase in its transmission loss for a long period of time even when it is exposed to a high-humidity or immersed in water, and it can be used as a coated optical fiber in the optical fiber cable.

What is claimed is:

1. A coated optical fiber comprising:
   a glass fiber coated by at least two coating layers, the at least two coating layers including a soft layer and a hard layer,
   wherein the at least two coating layers are made from an ultraviolet-curable resin, and
   the ultraviolet-curable resin of the soft layer includes oligomer which produces one of $C_3H_7O+$ (m/z 59) or $C_4H_9O+$ (m/z 73) peaks in cation analysis of Time-of-Flight Secondary Ion Mass Spectrometry (TOF-SIMS), and
   the glass surface of the glass fiber, where the at least two coating layers of the coated optical fiber are removed, has a peak intensity ratio of 0.6 or more in one of $C_3H_7O+$ (m/z 59) and $C_4H_9O+$ (m/z 73) peaks with respect to Si+ (m/z 28) peak in cation analysis of TOF-SIMS.

2. The coated optical fiber of claim 1, wherein the hard layer includes a color agent.

3. The coated optical fiber of claim 1, further comprising a color layer which coats the optical fiber.

4. The coated optical fiber of claim 3, wherein the color layer is made from an ultraviolet-curable resin.

5. An optical fiber ribbon comprising:
   a coated optical fiber comprising:
      a glass fiber coated by at least two coating layers, a soft layer and a hard layer, and
      a ribbon resin, which binds multiple coated optical fibers together in a planar array,
   wherein the at least two coating layers are made from an ultraviolet-curable resin, and
   the ultraviolet-curable resin of the soft layer includes oligomer which produces one of $C_3H_7O+$ (m/z 59) or $C_4H_9O+$ (m/z 73) peaks in cation analysis of Time-of-Flight Secondary Ion Mass Spectrometry (TOF-SIMS), and
   the glass surface of the glass fiber, where the at least two coating layers of the coated optical fiber are removed, has a peak intensity ratio of 0.6 or more in one of $C_3H_7O+$ (m/z 59) and $C_4H_9O+$ (m/z 73) peaks with respect to Si+ (m/z 28) peak in cation analysis of Time of Flight Secondary Ion Mass Spectrometry (TOF SIMS) TOF-SIMS.

6. The optical fiber ribbon of claim 5, wherein the at least two coating layers and the ribbon resin are made from an ultraviolet-curable resin.

* * * * *